United States Patent

Eck

Patent Number: 5,085,719
Date of Patent: Feb. 4, 1992

[54] VARIABLE RATE WELDING OF THERMOPLASTIC BELTS

[75] Inventor: David A. Eck, Oklahoma City, Okla.

[73] Assignee: Xerox Corporation, Stamford, Conn.

[21] Appl. No.: 583,057

[22] Filed: Sep. 14, 1990

[51] Int. Cl.⁵ .............................. B32B 31/16
[52] U.S. Cl. .................... 156/73.4; 156/73.1; 156/580.1; 264/23
[58] Field of Search .......... 156/64, 73.1, 73.4, 156/366, 359, 580.1; 425/174.2; 264/23

[56] References Cited

U.S. PATENT DOCUMENTS

| Re. 33,063 | 9/1989 | Okeda | 156/73.1 |
|---|---|---|---|
| 3,459,610 | 8/1969 | Dijkers et al. | 156/73 |
| 3,610,506 | 10/1971 | Robinson | 228/1 |
| 3,678,566 | 7/1972 | Ellis et al. | 29/470.3 |
| 3,717,539 | 2/1973 | Roberts | 156/498 |
| 3,879,256 | 4/1975 | Rust, Jr. | 156/580 |
| 3,939,033 | 2/1976 | Grgach et al. | 156/515 |
| 3,947,307 | 3/1976 | Bucksckeidt | 156/73.1 |
| 4,313,778 | 2/1982 | Mims | 156/358 |
| 4,496,095 | 1/1985 | Renshaw et al. | 228/102 |
| 4,532,166 | 7/1985 | Thomsen et al. | 428/57 |
| 4,533,423 | 8/1985 | Johnson et al. | 156/359 |
| 4,838,964 | 6/1989 | Thomsen et al. | 156/73.1 |

FOREIGN PATENT DOCUMENTS 2922834 12/1980 Fed. Rep. of Germany ... 53/DIG. 2

Primary Examiner—David A. Simmons
Assistant Examiner—J. Sells

[57] ABSTRACT

A process for welding including providing sheet material comprising a thermoplastic polymer, overlapping edges of the sheet material to form a lap joint, supporting the lap joint on an anvil, and welding the lap joint by contacting and traversing the lap joint with an ultrasonic welding horn, the improvement comprising initially contacting and traversing the lap joint with the welding horn at a first predetermined traverse rate and thereafter increasing the first traverse rate to a second higher predetermined traverse rate.

18 Claims, 7 Drawing Sheets

VARIABLE RATE WELDING OF THERMOPLASTIC BELTS

BACKGROUND OF THE INVENTION

This invention relates in general to a process for welding flexible belts and more specifically to a process for welding belts using a variable welding rate.

Various techniques have been devised to form belts from webs. Thermoplastic webs may be joined by overlapping the edge of one web over another and placing the overlapped or seam portion of the webs over a base beneath a vibrating welding element. The vibrating welding element may be a horn vibrating at an ultrasonic frequency while it is brought into forced contact with one side of the overlapped webs while the other side of the overlapped web seam is supported on an anvil surface. Transfer of vibratory energy from the horn to the web material is effected upon impact of a suitably shaped surface of the horn on the seam of the web material. The vibrating energy causes surface heat to be generated between the overlapping webs along the area of contiguous contact between the webs. The horn normally resonates toward and away from the seam at a frequency of about 16 kHz or higher, e.g. 20,000 kilohertz. A typical welding horn amplitude at a frequency of about 20,000 kilohertz is about 80 micrometers and a typical welding horn traverse rate is between about 4 centimeters per second and about 7 centimeters per second. Thus, for example, a traverse speed of about 5 centimeters per second is described in U.S. Pat. No. 4,838,964. The weld may be in the form of a chain of spots along the seam or a continuous weld. The technique of ultrasonic welding of thermoplastic material is well known and illustrated, for example, in U.S. Pat. Nos. 4,532,166, 4,838,964, 3,879,256, 3,939,033, 3,947,307 and 3,459,610, all of these patents being incorporated by reference herein in their entirety.

Acceptable welds for forming belt shaped electrophotographic imaging members have been obtained which perform satisfactorily when transported around relatively large diameter rollers. The welded seams of these belts contain a deposit of web material melted during welding. These deposits or "weld splashes" are formed on each side of the welded web adjacent to an adhering to each end of the original web and to the regions of the web underlying each splash. Unfortunately, when the belts are transported around very small diameter rollers having, for example a diameter of about 19 mm, the weld splash on the outer surface of the belt gradually separates from the upper end of the photoreceptor web during cycling to form an open crevasse or crack which is repeatedly struck by the cleaning blade during image cycling to cause the weld splash on the outer surface of the belt to also separate from the underlying web so that it is held to the belt at a small linear region located along the length of the splash on the side of the splash opposite the upper end of the photoreceptor web. This small linear region located along the length of the splash on the side of the splash opposite the upper end of the photoreceptor web functions as a hinge that allows the weld splash to pivot or flop away from the upper end of the photoreceptor web and from the underlying web so that carrier beads and toner particles collected in the space between the web and splash are periodically ejected when the splash flops open and closed when the seam passes the cleaning blade and also when it travels around small diameter rollers. The ejected material is carried to various subassemblies (e.g. corotrons, lamps) and causes them to fail and ultimately cause copy defects. Collisions of the blade with the flopping splash results in the blade becoming chipped and pitted. These chips and pits in the blade leave streaks of toner on the photoreceptor surface which eventually appear as streaks on copies made during subsequent electrophotographic imaging cycles and adversely affect image quality.

It has been discovered that splash separation in the photoreceptor during cleaning and passage around very small diameter rollers can be greatly minimized by welding the seams at very high horn oscillation frequencies of, for example, about 40 kilohertz and lower horn amplitudes of between about 60 micrometers and about 75 micrometers. This technique is described in a patent application entitled "HIGH FREQUENCY WELDING OF THERMOPLASTIC BELTS", filed in the names of Karl V. Thomsen et al on the same day as the instant application. The entire disclosure of the Karl V. Thomsen et al patent application is incorporated herein by reference. When seams are welded with welding horns operating at this high frequency and lower amplitude, the weld can occasionally be difficult to initiate. More specifically, the horn will occasionally lift up the top layer of the overlapped photoreceptor edges. The lifting of the top layer can cause pressure and heat transfer to the bottom layer to be unstable and a raised ridge can form in the thermoplastic material in the top layer on the overlapped photoreceptor seam in the region initially contacted with the moving welding horn. This raised ridge is struck by the doctor blade during the cleaning step of electrophotographic imaging cycles and eventually forms a notch in the edge of the cleaning blade which causes streaks to print out on every copy during electrophotographic image cycles. Belts having the raised ridge at the seam must be scrapped and the belt fabrication line must be shut down to allow readjustment of the welding station to reduce the number of defective belts formed.

INFORMATION DISCLOSURE STATEMENT

U.S. Pat. No. 4,496,095 issued to Renshaw et al. on Jan. 29, 1985—A method of progressively ultrasonically welding together metallic workpieces is disclosed in which an ultrasonic welding apparatus having a welding tip and complimentary anvil between which pieces are inserted. The workpieces are clamped, presqueezed and initial pressure and energy are introduced to scrub the workpieces. Then pressure and energy are synchronously ramped in phase to maximum levels to effect a spot weld on the workpiece while it is stationary. The spot weld is controlled automatically. See, for example, FIG. 1 showing the apparatus and FIG. 2 showing a graph of the power and timing cycle.

U.S. Pat. No. 3,678,566 issued to Ellis et al. on July 25, 1972—A friction welding process is disclosed in which the rate of axial shortening of a metallic workpiece due to burn-off during rotation is measured and this rate is used as a guide to determine the quality of a weld. Deviations are used to adjust the axial pressure to reduce the deviation, or as an alternative, the speed and relative rotation may be adjusted.

U.S. Pat. No. Re. 33,063 reissued to Obeda on Sept. 19, 1989—Apparatus and method are disclosed for welding two sheets of thermoplastic materials. A tapered horn having a serrated or knurled tip is vibrated at typically 40 kHz along the longitudinal axis of the horn in a direction transverse to the axis of a nip between a pair of rollers. The linear rate of sheet movement past each side of the horn tip should be between 3 to 4 feet per minute but depends on the thickness of the sheets. The speed should be relative to the amount of heat produced by the tip to provide a proper weld. The horn melts the facing surfaces of the two sheet and the rollers press and weld the sheets together.

U.S. Pat. No. 4,532,166 issued to Thomsen et al on July 30, 1985—A welded web is disclosed in which a first edge overlaps a second edge of a web, the first edge having at least one aperture which is at least partially filled with thermoplastic material from the second edge. Ultrasonic welding frequencies of 16 kHz or higher, e.g. 20 kHz, are disclosed. The welding horn is disclosed as traversing the seam at about 5 cm per second.

U.S. Pat. No. 4,838,964 issued to Thomsen et al. on June 13, 1989—A process is disclosed for fabricating belts by overlapping the edges of the belt to form a loop, transferring the loop to an anvil of a welding station and welding the belt. Ultrasonic welding frequencies of 16 kHz or higher, e.g. 20 kHz, are disclosed. The welding horn is disclosed as traversing the seam at about 5 cm per second.

U.S. Pat. No. 3,717,539 issued to Roberts on Feb. 20, 1973—Ultrasonic welding apparatus and method are disclosed for welding moving sheets of plastic. The rate of travel of the plastic sheets is typically one-half inch per second and ultrasonic vibration is set at 20,000 cycles per second. A cooling means is included for quenching the workpieces while being compressed to improve the weld. See, for example, FIG. 2.

U.S. Pat. No. 3,610,506 issued to Robinson on Oct. 5, 1971—A method is disclosed for ultrasonic welding of metals using a variable welding force. Force is applied to a stationary work by stationary welding apparatus at the start of a welding period, but the force applied rises more slowly than normal. See, for example, FIGS. 1 and 2.

When ultrasonic welding techniques are utilized to to fabricate belts, it is often difficult to achieve defect free surfaces on the belt seams. Moreover, when belts having welded seams, particularly photoreceptors in electrostatographic copiers, duplicators, printers and the like, are transported over small diameter rollers a sharp crease forms near the seam which causes deterioration of copy quality when blade cleaning is used during image cycling.

Thus, the characteristics of belt welding systems exhibit deficiencies in the rapid manufacturing of belts that must meet precise lap joint tolerance requirements.

SUMMARY OF THE INVENTION

It is an object of this invention to provide a welding process which overcomes the above-noted disadvantages.

It is another object of this invention to provide a welding process which reduces defects in welded seams.

It is still another object of this invention to fabricate a photoreceptor which avoids the formation of streaks on copies.

It is another object of this invention to provide a welding process which reduces downtime of the photoreceptor seam welding equipment.

It is still another object of this invention to provide a welding process which increases the total yield of welded photoreceptor belts.

It is another object of this invention to provide a welding process which increases the throughput rate of webs that are made into belts.

It is still another object of this invention to provide a welding process which extends the useful life of welding horns.

The foregoing objects and others are accomplished in accordance with this invention by providing a process for welding comprising providing sheet material comprising a thermoplastic polymer, overlapping edges of the sheet material to form a lap joint, supporting the lap joint on an anvil, and welding the lap joint by contacting and traversing the lap joint with an ultrasonic welding horn, the improvement comprising initially contacting and traversing the lap joint with the welding horn at a first predetermined traverse rate and thereafter increasing the first traverse rate to a second higher predetermined traverse rate.

BRIEF DESCRIPTION OF THE DRAWINGS

A more complete understanding of the process and apparatus of the present invention can be obtained by reference to the accompanying drawings wherein.

These figures merely schematically illustrate the invention and are not intended to indicate relative size and dimensions of actual welding systems or components thereof.

DESCRIPTION OF THE PREFERRED EMBODIMENTS

Figure 1:
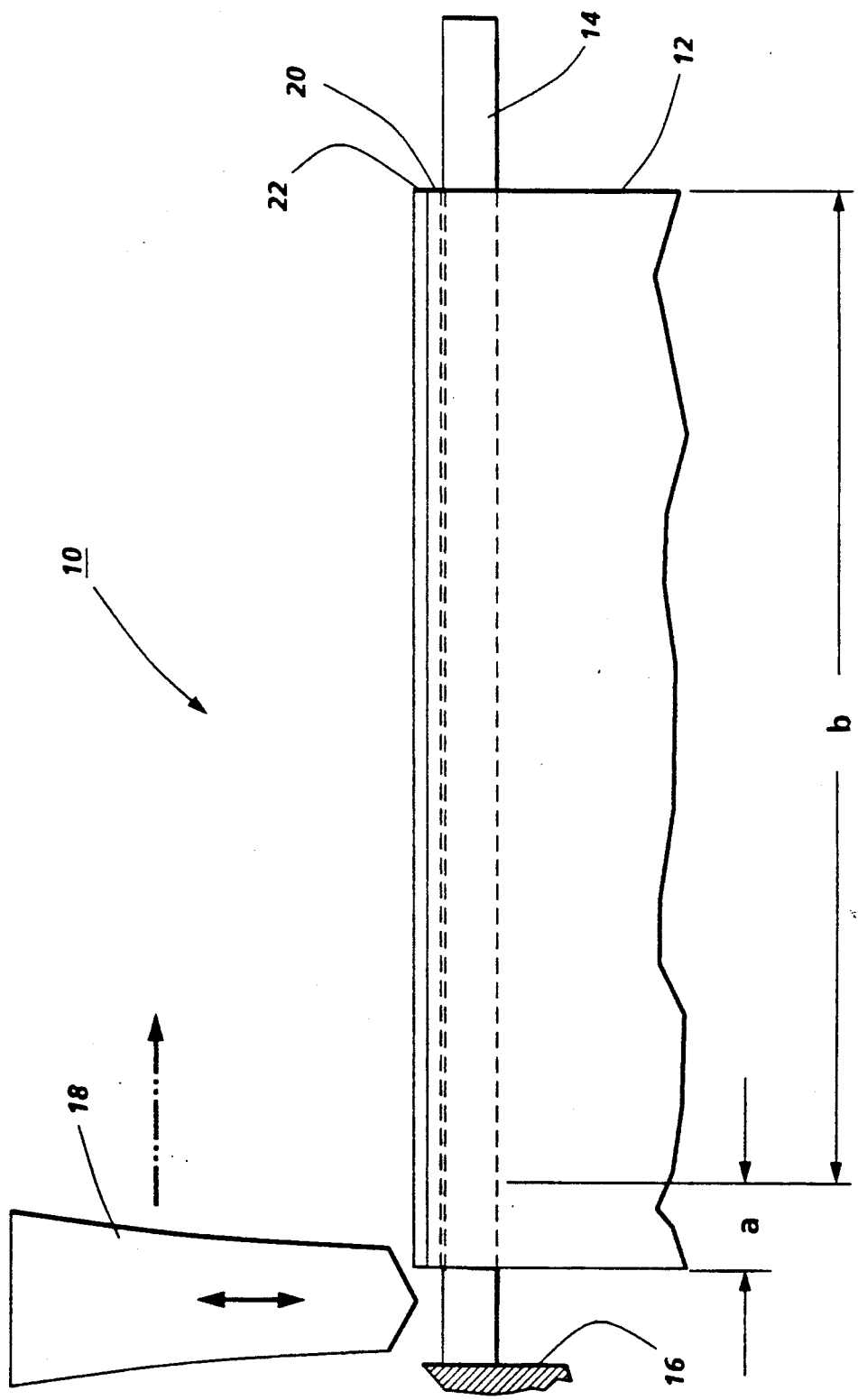
FIG. 1 is a schematic, sectional view in elevation of welding means for welding belts on an anvil.

Referring to FIG. 1, a welding station 10 for fabricating belts from a web 12 is shown. Welding station 10 comprises an anvil 14 cantilevered from a support means 16. Anvil 14 supports thermoplastic web 12 during welding of the web by ultrasonic welding horn 18. The segments of web 12 supported by anvil 14 comprise overlapping opposite edges 20 and 22 of web 12. Welding horn 18 reciprocates vertically as indicated by the vertical arrow. During welding of the overlapping opposite edges 20 and 22 of web 12 by welding horn 18, welding horn 18 moves horizontally in the direction indicated by the horizontal arrow. The initial traverse rate of welding horn 18 over overlapping opposite edges 20 and 22 of web 12 is relatively slow in the region indicated by the letter "a" and relatively rapid in the region indicated by the letter "b".

Figure 2:
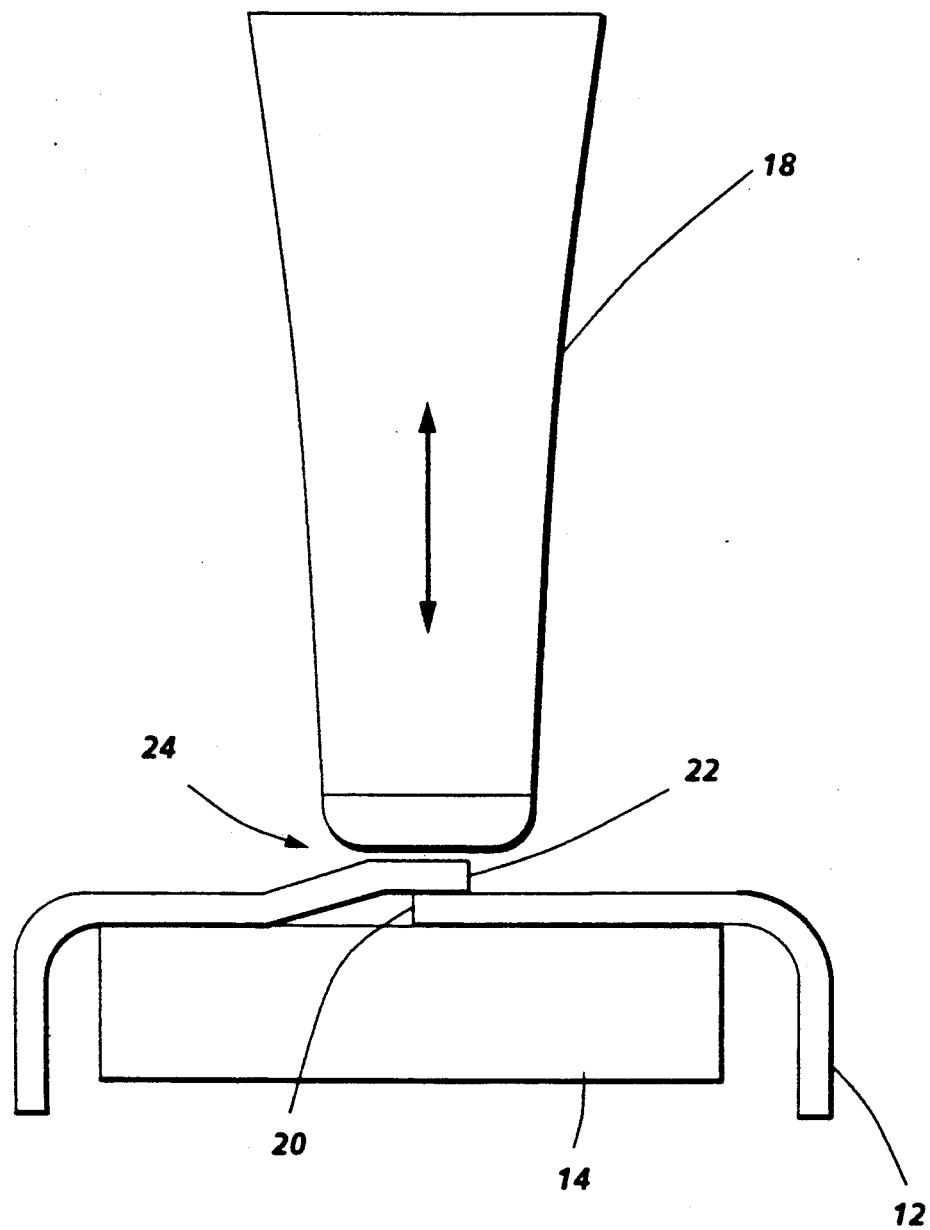
FIG. 2 is a schematic, sectional end view in elevation of welding means for welding belts on an anvil.

As shown in FIG. 2, web 12, such as a thin coated or uncoated thermoplastic web, is supported by anvil 14. More specifically, anvil 14 supports a lap joint 24 formed from overlapping opposite edges 20 and 22 of web 12. Lap joint 24 is welded by contacting lap joint 24 with ultrasonic welding horn 18.

Referring to FIGS. 3,4,5 and 6, an ultrasonic belt welding station 10 comprising an ultrasonic welding horn 18 and transducer assembly 30, also referred to as a sonotrode, is illustrated. A solenoid 32 is mounted on the upper hinge half 70 to extend or retract ultrasonic welding horn 18 and transducer assembly 30 in a vertical direction. The web lap joint 24 (shown in FIG. 2) formed by the overlapping segment ends of thermoplastic web 12 is supported by the upper surface of anvil 14 and held in place below the path of ultrasonic horn and transducer assembly 30 by suction from parallel rows of grooves 33,34,36 and 38 in the upper surface of anvil 14 (shown in FIG. 3), the grooves leading to vacuum plenums (not shown) within the interior of anvil 14. The ultrasonic horn and transducer assembly 30 is supported by assembly 65 comprising two collar clamps mounted to a vertical support mounted to the upper hinged half 70 of a substantially horizontally reciprocateable carriage 44. One side of of the lower hinged half 42 of carriage 44 is suspended from pillow blocks 46 and 48 which in turn slide on horizontal bar 50. The other side of carriage 44 is suspended from a pair of cam followers 52 that roll on the outer surface of horizontal bar 54. A rotatable lead screw 56 drives horizontally reciprocateable carriage 44 through ball screw 58 secured to carriage 44. Horizontal bars 50 and 54 as well as lead screw 56 are supported at each end by flanges 60 and 62 which are secured to a suitable support frame (not shown). Lead screw 56 is rotated by a belt 64 driven by electric motor 66 which is also supported by a suitable support frame (not shown). Adjustable set screw 68 is positioned to extend upwardly from the lower hinged half 42 of carriage 44 to assist in maintaining a predetermined spacing between the bottom of the ultrasonic horn of horn and transducer assembly 30 and the top of anvil 14 and to ensure application of a uniform pressure on the web lap joint as the bottom of the ultrasonic horn 18 traverses the lap joint 24 (see FIGS. 1 and 2). The end of set screw 68 rests against the bottom of upper hinged half 70 of carriage 44. The upper hinged half 70 and lower hinged half 42 of carriage 44 are joined by a hinge comprising a thin metal shim 72 fastened to upper hinged half 70 by bolted plate 74 and fastened to lower hinged half 42 by bolted plate 76. The hinge allows upper hinged half 70 of carriage 44 and ultrasonic horn of horn and transducer assembly 30 to pivot along the hinge during welding to compensate in a substantially vertical direction for any irregularities encountered along the lap joint 24 (see FIGS. 1 and 2) during welding. An air bellows 78 is positioned between upper hinged half 70 and lower hinged half 42 of carriage 44 to adjust the pressure of the bottom of the ultrasonic horn 18 against the web lap joint 24 (see FIGS. 1 and 2), e.g. to function as a counterbalance.

In operation, ultrasonic horn 18 and transducer assembly 30 are in a retracted position because solenoid 32 is activated. Lap joint 24 of overlapping opposite edges 20 and 22 of web 12 (see FIGS. 1 and 2) carried on the upper surface of anvil 14 is securely positioned under the horizontal path to be taken by ultrasonic horn 18. Vacuum is applied to grooves 33, 34, 36 and 38 in the upper surface of anvil 14 hold the overlapping opposite edges 20 and 22 of web 12 in place during welding. The length of grooves 33, 34, 36 and 38 is normally slightly shorter than the width of web 12. Any suitable vacuum aperture, such as grooves or holes, may be utilized. Vacuum plenums (not shown) below the grooves 33, 34, 36 and 38 are connected by passages (not shown) to suitable fittings and hoses through control valves (not shown) to a vacuum source. Activation and inactivation of the vacuum plenums can be independently accomplished by any suitable programmable controller to control conventional valves to connect the vacuum plenums by suitable hoses (not shown) to a source of vacuum or to vent the vacuum plenums to the atmosphere. A hard metal strip insert 39 can be utilized in the anvil along the welding path of the welding horn 18 anvil. Strip insert 39 may comprising any suitable material such as stainless steel, A4 tool steel, 02 steel, and the like, which can withstand abrasive conditions such as those encountered during belt lap joint welding.

Solenoid 32 is inactivated to extend the transducer in ultrasonic horn 18 and transducer assembly 30 toward anvil 14 and adjacent to but not in contact with one end of lap joint 24. Because it is difficult to lower the horn 18 precisely on the extreme edge of the lap joint 24 every time for each fresh web, it is preferred that the horn be lowered adjacent to the edge of the lap joint 24 and then be moved slowly onto the lap joint 24. If desired, horn 18 may be held stationary and lap joint 24 (as well as anvil 14) may be moved relative to horn 18 or both horn 18 and lap joint 24 may be moved relative to each other to effect traversal of horn 18 along lap joint 24. Movement of anvil 14 may be effected by any suitable reciprocatable and conventional means. The transducer in ultrasonic horn and transducer assembly 30 is activated and electric motor 66 (see FIG. 4) is activated to drive lead screw 56 at a predetermined first speed which in turn moves horizontally reciprocateable carriage 44. Movement of horizontally reciprocateable carriage 44 carries ultrasonic horn 18 into compressive engagement with lap joint 24. After initial contact of the horn 18 at the predetermined initial or first traverse rate, the speed of electric motor is increased continuously or in one or more increments to a final predetermined higher traverse rate. A reduced initial contact speed or traverse rate ensures that no undesirable raised ridge is formed in the welded seam.

The welding surface of the ultrasonic horn 18 may be of any suitable shape such as the flat or curved cross-sectional shapes illustrated, for example, in U.S. Pat. Nos. 3,459,610 and 4,532,166, both of which are incorporated herein by reference in their entirety. The high vibration frequency of the ultrasonic horn 18 along the its vertical axis causes the temperature of at least the contiguous overlapping surfaces of thermoplastic web 12 to increase until at least the thermoplastic material in the overlapping opposite edges 20 and 22 flows. Welding of the contiguous overlapping surfaces of thermoplastic web 12 occurs because the thermoplastic material flows as a result of the applied energy of ultrasonic oscillations. The thermoplastic material that is induced to melt and weld the lap joint 24 may be provided solely by a coating on the web, from both a coating and a web substrate, or solely from the web itself. Web 12 may be of any suitable thickness which will allow adequate heating of the contiguous overlapping surfaces of the web edges by the applied ultrasonic energy to cause the thermoplastic material to melt and weld the overlapping edges of web 12 at lap joint 24. It is believed that the rapid impaction of one edge of web 12 with the other edge of web 12 at the contiguous overlapping web surfaces between the anvil 14 and ultrasonic horn 18 causes generation of heat which maximizes melting of the thermoplastic material. If desired, the horn 18 may comprise any suitable highly thermoconductive material such as aluminum to ensure achievement of higher temperatures at the interface between the overlapping edges of web 12, to minimize thermal distortion of the exposed surfaces of the web 12, and to remove the heat, generated by the horn, from the thermoplastic material before the tip pressure exerted by horn 18 is removed from the welded seam. This prevents the material from boiling and producing a ridge at the seam.

Figure 3:
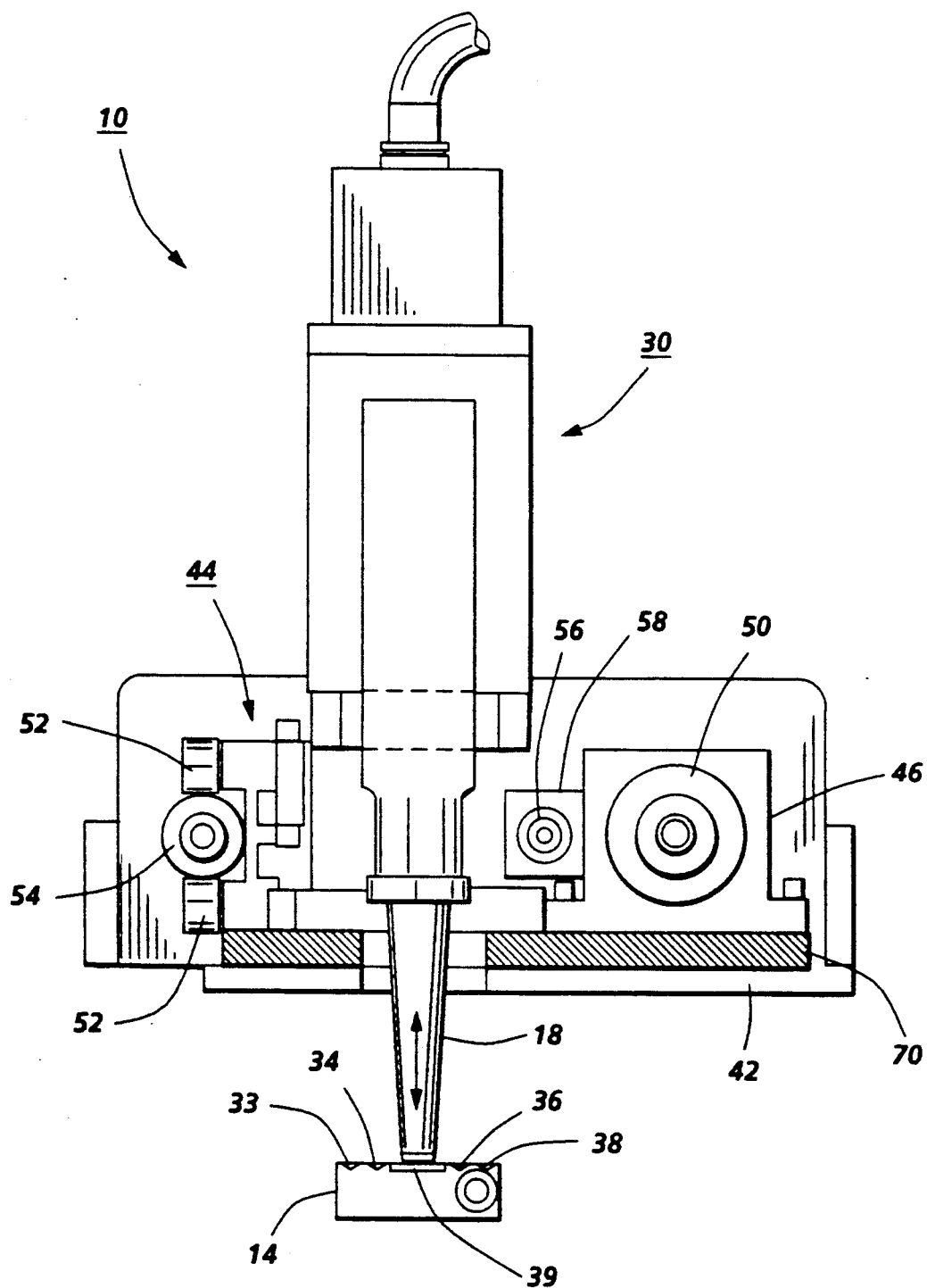
FIG. 3 is a schematic, sectional view in elevation of a welding means for welding belts on an anvil.
Figure 4:
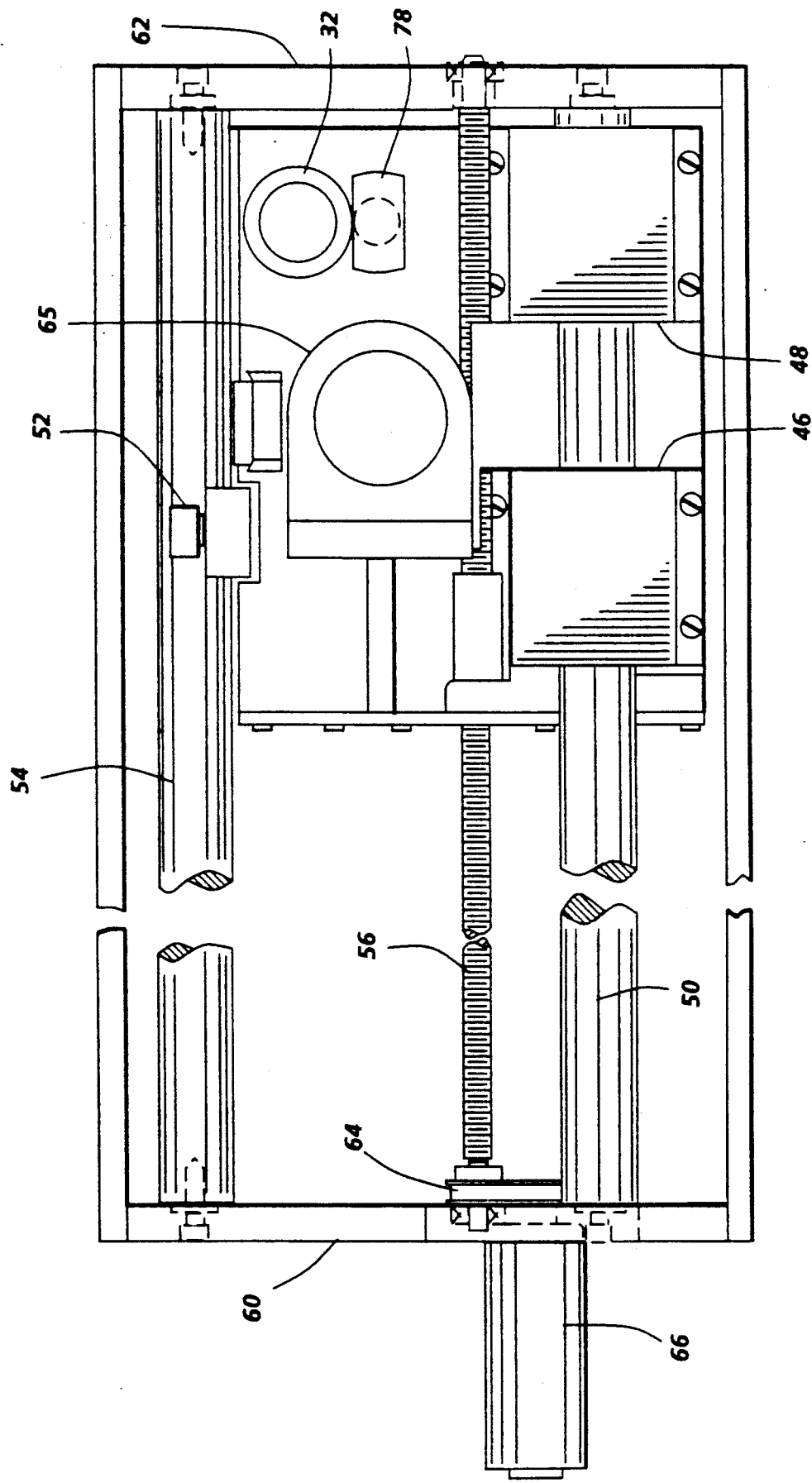
FIG. 4 is a schematic, sectional plan view of a welding means for welding belts on an anvil.
Figure 5:
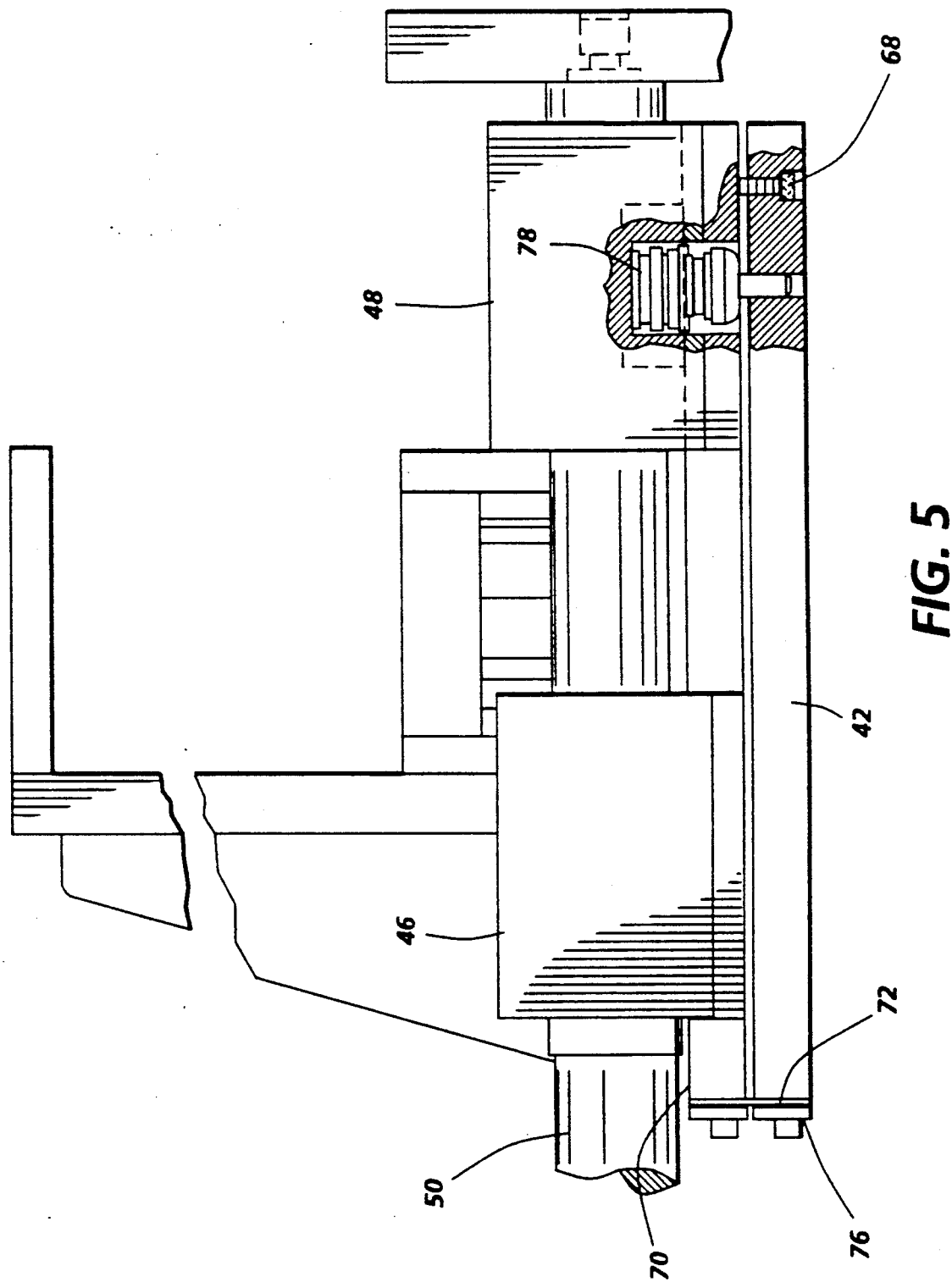
FIG. 5 is a schematic, sectional view in elevation of a welding means for welding belts on an anvil.
Figure 6A:
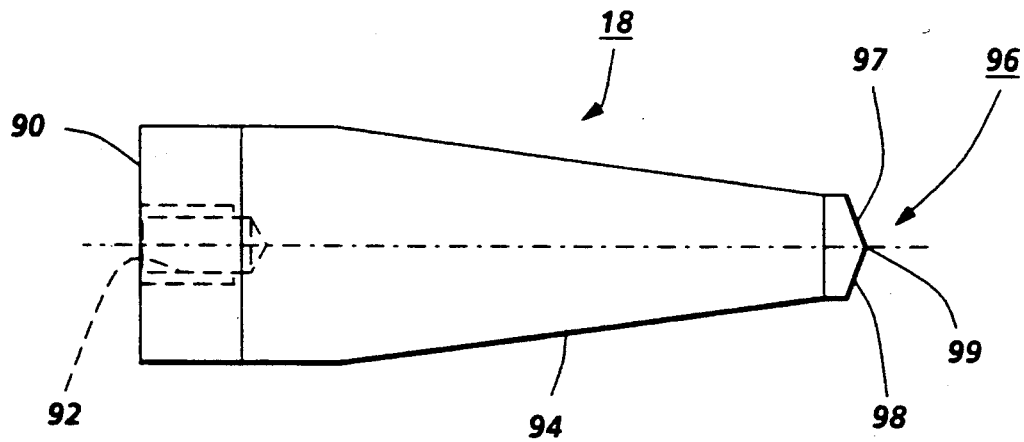
FIG. 6A is a schematic, sectional view of a welding horn for welding belts on an anvil.
Figure 6B:
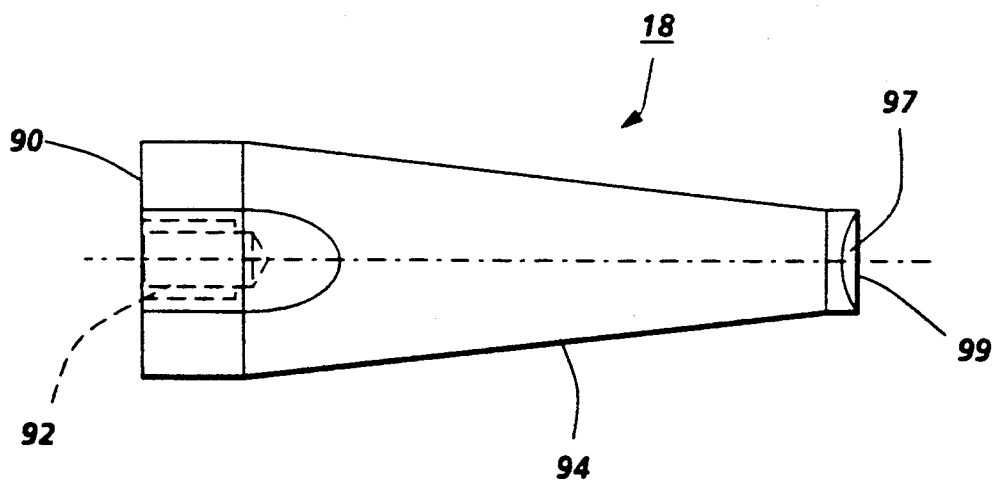
FIG. 6B is a schematic, sectional view of a welding horn for welding belts on an anvil, viewed at an angle 90° to the view illustrated in FIG. 6A.

In FIGS. 6A and 6B a preferred welding horn 18 is shown comprising an upper end 90 which has a threaded recess 92 for receiving a threaded stud (not shown) extending from the transducer of the ultrasonic horn and transducer assembly 30 (see FIG. 3). Horn 18 is generally cone shaped with a tapered side 94 that terminates at welding tip 96. Welding tip 96 has a "chisel" shape with inclined flat faces 97 and 98 that join at an apex or point 99. If desired, the faces 97 and 98 may be of different sizes so that the apex 99 is offset from the axis of horn 18. Although the end of the welding horn 18 may be of any suitable shape. The shallow chisel profile shown in FIGS. 6A and 6B is a preferred shape, the apex 99 is preferably flattened (not shown) by any suitable technique, such as by sanding with 600 grit dry sandpaper or crocus cloth, to form a flat surface with a width, for example, of about 0.4 millimeter to about 1 millimeter. The shallow chisel shape and flattened end extends the horn mass closer to the lap joint during welding to enhance absorption of heat and to minimize heat buildup. However, other suitable shapes and sizes well known in the welding art may also be utilized.

Figure 7:
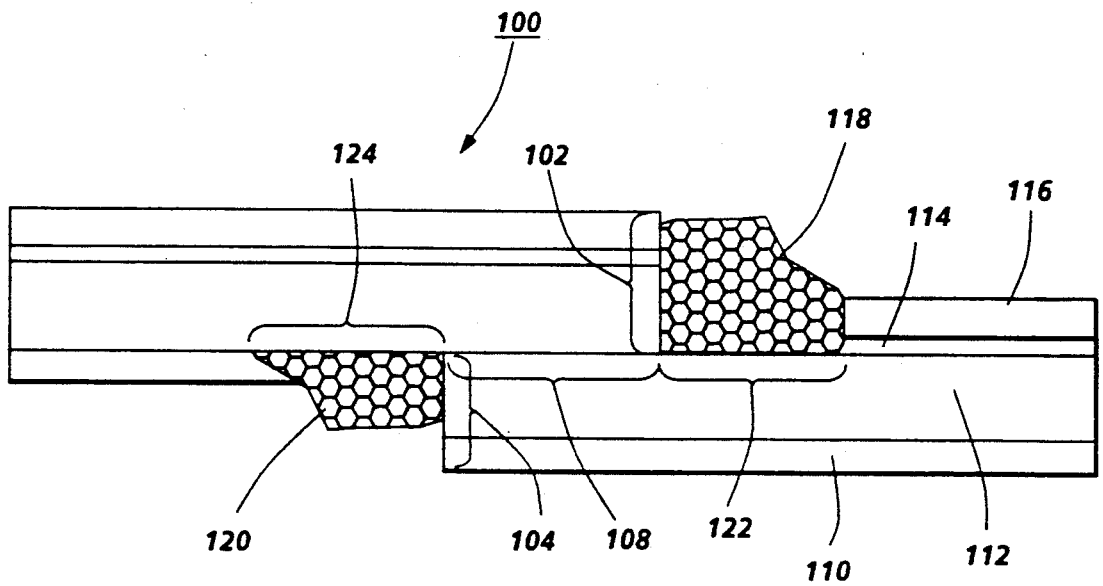
FIG. 7 is a schematic, sectional view in elevation of the welded joint of a prior art flexible photoreceptor.

Referring to FIG. 7 a cross section o conventional prior art welded belt photoreceptor 100 is schematically illustrated. The ends 102 and 104 of a photoreceptor web employed to form belt photoreceptor 100 overlap to form a lap interface 108. The photoreceptor web comprises an anticurl layer 110, a flexible substrate layer 112, a charge generating layer 114 and a charge transport layer 116. Generally, the anticurl layer 110, flexible substrate layer 112 and charge transport layer 116 comprise solid thermoplastic film forming polymers. After completion of welding of prior art belt photoreceptors at a frequency of about 20 kHz, a deposit of web material melted during welding form weld splashes 118 and 120 on each side of web 106 adjacent to and adhering to each end 102 and 104 and to the regions 122 and 124 of the web 106 underlying each splash 118 and 120, respectively.

Figure 8:
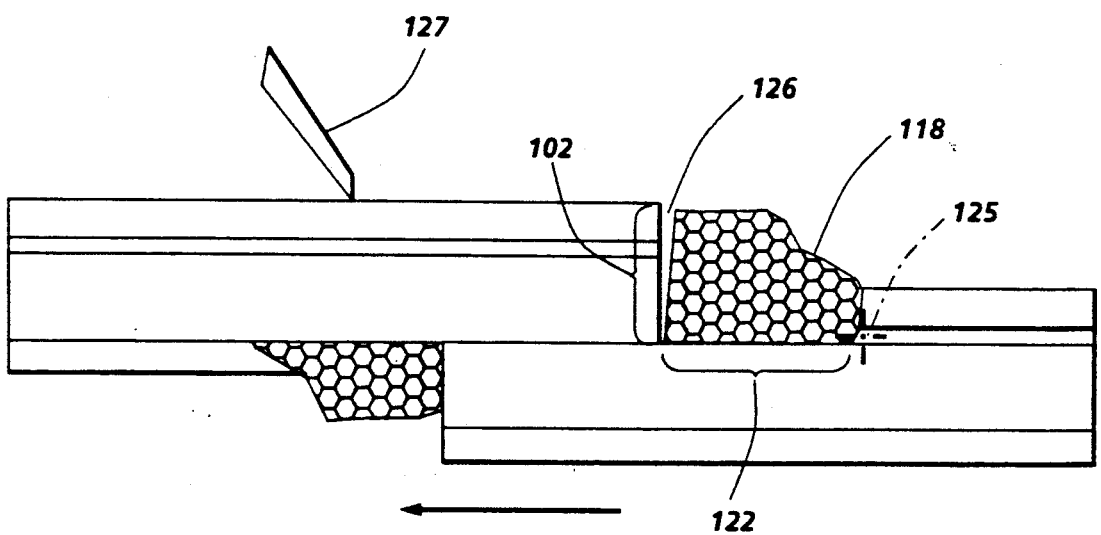
FIG. 8 is a schematic, sectional view in elevation of the welded joint of a prior art flexible photoreceptor after it has been repeatedly cycled.

As shown in FIG. 8, upon extended cycling of belt photoreceptor 100 around very small diameter rollers to form electrophotographic images on charge transport layer 116, the weld splash 118 on the outer surface of the belt photoreceptor 100 gradually separates from the upper end 102 of the web during cycling to form an open crevasse or crack 126 which is repeatedly struck by the cleaning blade 127 during image cycling to cause the weld splash 118 on the outer surface of the belt photoreceptor 100 to also separate from the region 122 of the underlying web so that it is held to the belt at a small linear region 125 located along the length of the splash on the side of weld splash 118 opposite the upper end 102 of the photoreceptor web 100. This small linear region 125 located along the length of the splash 118 on the side of the splash opposite the upper end 102 of the photoreceptor web 100 functions as a hinge that allows the weld splash 118 to pivot or flop away from the upper end 102 of the photoreceptor web 100 and from the underlying web so that carrier beads and toner particles collected in the space between the web and splash are periodically ejected when the splash flops open and closed as the seam passes the cleaning blade 127 and when it travels around small diameter rollers. The ejected material is carried to various subassemblies (e.g. corotrons, lamps) and causes them to fail and ultimately cause copy defects. Collisions of the blade 127 with the flopping splash 118 results in the blade 127 becoming chipped and pitted. These chips and pits in the blade leave streaks of toner on the photoreceptor web surface which eventually appear as streaks on copies made during subsequent electrophotographic imaging cycles and adversely affect image quality.

For satisfactory results, the horn vibration frequencies during the predetermined initial or first traverse rate should be between about 15 kHz and about 50 kHz and during the final predetermined higher traverse rate should be between about 30 kHz and about 45 kHz to ensure that the thermoplastic material is sufficiently softened and to prevent the formation of splashes that partially separate from the web and flop back and forth during cycling. Preferably, for stronger welds and greater adhesion of the weld splash to the web, the horn vibration frequencies should be constant at a frequency between about 38 kHz and about 42 kHz during the entire contact welding pass over the lap joint. A typical horn suitable for joining thin thermoplastic webs utilizes a sonic generator of about 400-800 watt capacity, an operational frequency of about 40 kHz, and a flat input horn welding surface about 12 millimeters long and about 0.4 to about 1 millimeter wide at the bottom of a generally chisel shaped profile. A typical reciprocal motion amplitude for this horn is between about 60 micrometers and about 75 micrometers. The combined weight of between about 4.5 kilograms and about 5 kilograms for the solenoid 32, ultrasonic horn and transducer assembly 30, and upper hinged half 70 of carriage 44 is sufficient to bring the horn 18 into forced contact with the lap joint 24. However, air bellows, a spring bias, weights, counterweights, or other suitable means may be utilized to increase or decrease the contact force. Since heat is generated very rapidly at the interface of the overlapping web ends at the lap joint with this type of device, sufficient heat to cause the thermoplastic materials to melt can occur typically in about 0.01 second and about 0.25 second as the horn traverses the along lap joint 24. For example, at a relatively high traverse rate of about 70 mm/sec, and a horn tip width of 0.7 mm, the horn tip is typically in contact with a particular point of the lap joint for about 0.01 second. At a lower horn traverse rate of about 4 mm/sec and a horn tip width of about 1 mm, the horn tip is typically in contact for about 0.25 second at any given location on the seam. These conditions are typical for thermoplastic photoreceptor web material having a thickness of between about 100 micrometers and about 150 micrometers. However, thicker web materials would require additional dwell time to ensure satisfactory welds. Similarly, thinner web materials would require less dwell time to ensure satisfactory welds. It is believed that initial welding of a lap joint at high frequencies can cause the thermoplastic material to melt and if the heat is not remove rapidly, the thermoplastic material will also vaporize, the vaporizing thermoplastic material causing undesirable raised ridges to form at the welded seam of finished belts. Since it would seem that higher initial traverse speeds would reduce the horn dwell time and reduce heating and vaporizing, it is indeed surprising to find that decreasing the initial welding traverse rate eliminates the raised ridge defects. It has been discovered that increasing dwell time and preventing lifting of the top layer of the overlapped material achieves greater heat transfer from the material into the horn thereby reducing the amount of heat that remains in the material.

As the horn 18 is lowered to the lap joint of web 24, electrical power is supplied to the transducer in the ultrasonic horn and transducer assembly 30 and electric motor 66 is activated to initially drive lead screw 56 at the predetermined first speed or rate which in turn moves horizontally reciprocateable carriage 44 and ultrasonic welding horn 18 along the lap joint of web 24. After initiation of welding at the first predetermined speed, the speed of traverse of horn 18 over the lap joint of web 24 is increased continuously or incrementally to a predetermined final speed. After carriage 44 completes its traversal of the lap joint, solenoid 32 is activated to retract the transducer in ultrasonic horn and transducer assembly 30 away from anvil 14, the transducer in ultrasonic horn and transducer assembly 30 is inactivated and solenoid 32 is inactivated and electric motor 66 is reversed to return horizontally reciprocateable carriage 44 to its starting position.

As described above, initial contact of the ultrasonic welding horn is effected at a predetermined first speed or traverse rate, the speed being increased continuously or in one or more increments to a final predetermined higher speed. Satisfactory welding results may be achieved when the initial speed of welding is between about 4 millimeters per second and about 25 millimeters per second for thermoplastic webs having a thickness between about 100 micrometers and about 150 micrometers. Preferably, the welding horn is transported at an initial rate of between about 6 millimeters per second and about 10 millimeters per second. Optimum results are achieved with an initial rate of between about 7 millimeters per second and about 8 millimeters per second. When the speed is less than about 4 mm/sec, the horn moves so slowly that it applies too much energy to the lap joint and displaces the thermoplastic material rather than joining it. However, for thicker web material this speed may be acceptable. In the case of traversing at speeds greater than about 25 mm/sec, the chance of stubbing is increased and the welder will experience more difficulty in avoiding a raised ridge on the seam. For satisfactory results, the time period from initial contact of the lap joint by the ultrasonic welding horn to the moment when the speed is increased to the value of the final predetermined higher horn transport speed may be between about 0.2 second and about 2 seconds. Preferably, the time period from initial contact to attainment of the final speed is between about 0.5 second and about 1 second. Optimum results are achieved with an initial welding period of between about 0.7 second and about 0.8 second. When the time period from initial contact of the lap joint by the ultrasonic welding horn is less than about 0.2 second the weld will not have begun completely and increasing the speed at this point will produce the raised ridge defect. When the initial welding time period exceeds about 2 seconds the weld will have started correctly but due to the fact that the welder is moving so slowly it will cause the thermoplastic material to be pushed out from under the horn and cause the seam to be weak and too wide. Satisfactory welding results may be achieved when the second final predetermined horn traverse speed is between about 30 millimeters per second and about 70 millimeters per second. Preferably, the welding horn is transported at a final rate of between about 45 millimeters per second and about 60 millimeters per second. Optimum results are achieved with a final welding speed of between about 50 millimeters per second and about 55 millimeters per second. When the horn traverses the seam at greater than about 70 mm/sec. the thermoplastic layers tend to not join because insufficient energy is transmitted into the material and the material does not reach a temperature sufficient to allow the layers to join properly. When the traverse speed is less than about 30 mm/sec the dwell time is too long and the thermoplastic material is melted and then pushed out from under the horn causing the seam to be too weak and to be too wide. The horn traverse speed is preferably held constant during the final predetermined high traverse speed if the thickness of the lap joint is uniform. However, the speed at any point during the weld cycle may be increased or decreased to control the amount of energy being applied or to change the characteristics of the weld itself. For example, the speed can be changed within the limits described herein to accommodate variations in the thickness of the lap joint material along the length of the lap joint.

Instead of maintaining the horn traverse rate constant at the same speed as the first initial predetermined welding speed during the period between initial lap joint welding and the moment of speed increase to the traverse rate of the final predetermined speed, the initial welding rate can be ramped up from an initial rate to the final welding rate. Such ramping can be accomplished in a step-wise fashion or continuously, in a linear manner, or in a parabolic or other curved fashion. Transport of the horn over the lap joint may be effected by any suitable means. A typical transport means is shown in the figures. Instead of a worm gear drive system, other suitable and well known means may be utilized such as a belt and pulley system, a linear motor, a servo controlled motor, and the like. If desired, the welding means may be stationary and the lap joint may be moved or, alternatively, both the welding means and lap joint may simultaneously be moved relative to the other to achieve traversal of the horn along the lap joint. The speed of horn traverse over the lap joint may be changed by any suitable means. Typical speed control means include variable speed drives controlled with potentiometers, stepper-motors controlled by a closed loop or open loop system, servo-motors controlled by a closed or open loop system, and the like. The speed of the variable speed motors can also be controlled by any conventional and suitable programmable controller. Electrical power to drive electrical equipment such as the motors are supplied through suitable wiring and conventional suitable electrical switching. The switches and potentiometers can be actuated through suitable circuitry in response to a signal from the programmable controller. Thus, for example, the control functions in the process of this invention can be synchronized and integrated with a suitable programmable controller such as a Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate electric switches, and the like. Termination of an activated component may be effected by any suitable and conventional means such as by the programmable controller or by suitable limit switches.

Any suitable highly thermally conductive welding horn material may be utilized. Preferably, the horn comprises aluminum because of its superior thermal conductivity and heat-sink capabilities. Optimum results are achieved with an aluminum alloy. Particularly preferred is 7075T6 aluminum alloy because of its heat conductivity, hardness and resistance to wear. 7075T6 aluminum alloy is a standard alloy developed for aircraft components. Other highly thermally conductive welding horn materials include, for example, titanium. Generally, the horn preferably should comprise material having a thermal conductivity which facilitate absorption of heat and minimizes heat buildup. The size and mass of the horn should be sufficient to avoid feedback and overload of the power supply employed. The end of the welding horn may be of any suitable shape. A preferred shape is a shallow chisel profile in which two flat surfaces meet at an apex, the angle between the plane of each surface forming an acute angle of between about 10 degrees and about 30 degrees with an imaginary plane perpendicular to the vertical axis of the horn and intersecting the axis at the point where the apex also intersects the axis. This inclined surface functions as a ramp on which the horn rides up onto the lap joint. The apex is preferably flattened by a suitable technique, such as by sanding with 600 grit dry sandpaper or crocus cloth, to form a flat surface with a width, for example, of about 0.4 millimeter to about 1 millimeter. The shallow chisel shape and flattened end extends the horn mass closer to the lap joint during welding to enhance absorption of heat and to minimize heat buildup. However, other suitable shapes and sizes well known in the welding art may also be utilized. For example, the end of the welding horn or the welding surface may be in the form of a flat surface having the shape of a round dot having a diameter of about 4 millimeters. Preferably, the apex length is greater than the length of seam overlap and width of the splash to compensate for any for error in placing the seam under the horn. A typical apex length is about 30 percent greater than the length of seam overlap.

Generally, the anvil underlying the overlapped seam during welding is a rigid surface which can withstand the rigors of the welding process. Typical anvil surfaces include metals such as stainless steel, A4 tool steel, O2 steel, and the like. For embodiments where the anvil moves during welding to provide relative motion between a moving or stationary welding horn, such movement may be accomplished by any suitable means such as a lead screw and ball arrangement, belt and pulley drive, and the like.

The distance from the bottom of the horn at the midpoint of each vertical stroke relative to the surface the anvil during welding of the lap joint is dependent upon the thickness of the thermoplastic material. Generally, the bottom of the horn at the midpoint of each vertical stroke relative to the surface of the anvil during welding of the lap joint should be at a distance between about 10 and about 75 percent of the thickness of the lap joint being welded. Preferably the distance is between about 35 percent and about 70 percent of the thickness of the lap joint being welded. Optimum welded seam integrity and smoothness is achieved with a distance of between about 45 percent and about 55 percent of the thickness of the lap joint being welded. If the distance between the horn and the anvil is greater than 75 percent of the lap joint being welded there will not be enough pressure on the seam to form the bond between the two layers and a weak weld will be obtained. If the distance is less than 10 percent of the thickness of the lap joint the horn will try to lift the top layer of the overlapped material and not start the weld correctly and it is also more likely that the horn will hit the anvil when it begins its vibratory motion and damage the horn. The length of each horn stroke may be of any suitable length. Typical stroke lengths range from about 50 micrometers to about 150 micrometers. Preferably, the stoke length selected should not be so long that the horn strikes the anvil surface. However, even if the horn initially contacts the anvil prior to riding up on the lap joint, once the horn tip is on the lap joint, the lap joint will support the weight of the welding fixture and increase the distance between the horn tip and the anvil.

Any suitable seam overlap may be utilized. A preferred range of overlap is between about 0.7 millimeter and about 1.7 millimeters.

Any suitable thin, flexible web comprising a thermoplastic layer may be used in the apparatus and process of this invention. The web may comprise a single layer or a plurality of layers in which at least one of the layers comprises thermoplastic material. Any suitable thermoplastic, polymeric material which will melt at the temperatures generated at the contiguous overlapping web surfaces of the seam may be utilized. Typical thermoplastic, polymeric materials include polyethylenes, polypropylenes, polycarbonates, polyvinylacetate, terephthalic acid resins, polyvinylchloride, styrene-butadiene copolymers and the like. The thermoplastic material that is induced to melt and weld the seam may be provided solely by a thermoplastic coating on the web, from both a coating and a web substrate, or solely from the web itself. Thus, for example, a nonthermoplastic web substrate may be coated with a thermoplastic material which is the sole source of the material which melts. Alternatively, for example, the web may be uncoated and consist entirely of the thermoplastic material, some of which melts to weld the seam. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web at the seam. Preferred web thicknesses for use with ultrasonic welding can range from between about 25 micrometers to about 500 micrometers. Thicker webs may be utilized as long as sufficient heat is applied to the contiguous overlapping surfaces of the web to cause the thermoplastic material to melt. Webs having a thickness up to about 10 millimeters may be joined with the process and apparatus of this invention. The web containing the aperture may be thermoplastic or non-thermoplastic. This technique may be utilized to join dissimilar or similar materials. Although the fabrication of a flexible belt is a preferred embodiment of this invention, the process may be utilized to join multiple sheets or webs. Thus, the word "sheet" is intended to encompass webs, sheets, straps, and the like. The webs may be of any suitable shape and may be separate webs or a single web. The opposite edges of a single web may be joined to form, for example, a continuous loop, belt or mobius strip.

The flexible belts may be rapidly prepared without attendant problems caused by ridge formation at one end of the belt seam. Further, because of the precise seam tolerances achieved, the flexible belts prepared by the processes of this invention are particularly useful for applications such as electrostatographic imaging members utilizing sensitive organic layers supplied in the form of long webs. Further, the process of this invention extends the useful life of welding horns thereby reducing the frequency of fabrication line down time.

It has also been found that normal wear on the welding horn will produce a pit in aluminum horns which cause the horn to either burn the thermoplastic material or discolor it, creating a weak weld in prior welding processes. Although, the horn still deteriorates in the same manner when employed in the process of this invention, surprisingly, the horn may be used for welding for a longer period of time because the welding process of this invention is much more tolerant to worn and pitted horns. Thus, the process of this invention yields increased horn life and less fabrication line downtime.

EXAMPLE

In a specific example, a web of polyester film (Mylar, available from E. I. duPont de Nemours and Co.) having a width of about 33.5 cm, a length of about 59 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. This web was processed in an apparatus similar to the apparatus illustrated in the drawings. The leading edge of the web was placed on along the length of the upper surface of an anvil having a width of about 10 cm and a length of about 50 cm and held in place by a vacuum applied to apertures in the anvil underlying the leading edge of the web. The web covered slightly more than half of the upper surface of the anvil. The opposite edge of the web was brought under the anvil and placed on the exposed portion of the upper surface of the mandrel and over part of the leading edge of the web that was previously placed on the mandrel. The opposite edge overlapped the leading edge by about 0.9 mm. The opposite edge was held in place by a vacuum applied to apertures in the anvil underlying the opposite edge of the web. The anvil carrying the newly formed belt loop was then positioned under a reciprocateable ultrasonic welding horn. The ultrasonic welding horn supported in a carriage was lowered against the web lap joint. The horn was biased against the seam due to the controlled weight of about 4.5 to 5 kilograms of horn, transducer, bracket and any counterweight pressing against the seam supported by the mandrel. The horn was formed from 7075T6 aluminum alloy. The horn had a generally chisel shaped input horn welding surface in which the point of the chisel was about 12 millimeters long and a flattened chisel "point" about 0.5 mm wide. The horn was operated at a frequency of 40 kHz and a motion amplitude of about 60-75 micrometers and was driven by a Branson 40 kHz 4MB3 800 watt power supply with amplitude adjustment module VU-1, a Branson 40 Khz 2.0:1 booster aluminum 101-149-081, and a Branson 40 Khz converter 101-135-042. The horn was transported by the carriage in a substantially horizontal path along the web lap joint at an initial constant rate of about 7 millimeters per second for about 0.7 second. The carriage was driven by a worm gear which was in turn rotated by a belt connected to the shaft of a variable speed electric motor. The speed of the electric motor was controlled by conventional potentiometers. By changing the setting of the potentiometers, the rate of seam traverse by the horn was increased after 0.7 second at the initial horn transporting rate to about 60 millimeters per second. During welding, the horn was allowed to freely move vertically to accommodate variations in the web lap joint thickness. The seam (lap joint) prior to welding had a thickness of about 260 micrometers. During welding, the welding surface of the horn reciprocated through a distance of about 76 micrometers and the total distance between the welding surface of the reciprocating horn (from the midpoint of the stroke) and the surface of the underlying anvil was about 100 micrometers. This welding procedure caused the thermoplastic materials in the web to uniformly melt and weld the web seam. Upon completion of the welding of the belt lap joint, the ultrasonic welding horn was raised away from the web lap joint to a retracted position. Examination of the welded belt seam revealed no raised ridges.

The apparatus and process of this invention welds webs into belts with minimal formation of raised ridges along the welded seam. Further, the marked reduction of raised ridges decreases the likelihood of seam defects that fail to meet the precision tolerances for flexible photoreceptors for high speed electrostatographic copiers, duplicators, printers and the like.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for welding comprising providing sheet material comprising a thermoplastic polymer, overlapping edges of said sheet material to form a lap joint, supporting said lap joint on an anvil, and welding said lap joint by contacting and traversing said lap joint with an ultrasonic welding horn, the improvement comprising initially contacting and traversing a first portion of said lap joint with said welding horn at a first predetermined traverse rate and thereafter increasing said first traverse rate to a final higher predetermined traverse rate over a second portion of said lap joint while maintaining said horn at a substantially constant frequency during the entire welding pass through said first and second portions.

2. A process for welding according to claim 1 wherein said sheet material is a single sheet and said overlapping edges comprise a leading edge and trailing edge of said sheet whereby a belt loop is formed.

3. A process for welding according to claim 1 wherein said sheet material is two sheets.

4. A process for welding according to claim 1 initially contacting and traversing said lap joint with said welding horn at a first predetermined traverse rate of between about 4 millimeters per second and about 25 millimeters per second and thereafter increasing the traverse rate to a final higher predetermined traverse rate of between about 30 millimeters per second and about 70 millimeters per second.

5. A process for welding according to claim 1 including maintaining said first predetermined traverse rate constant for a predetermined time period prior to increasing the traverse rate to said final higher predetermined traverse rate.

6. A process for welding according to claim 1 wherein the time period between initially contacting and traversing said lap joint with said welding horn at a first predetermined traverse rate and attaining said final higher predetermined traverse rate is between about 0.2 second and about 2 seconds.

7. A process for welding according to claim 1 including increasing the traverse rate immediately after initially contacting and traversing said lap joint with said welding horn at said first predetermined traverse rate until the traverse rate attains said final higher predetermined traverse rate.

8. A process for welding according to claim 1 including continuously increasing the traverse rate after initially contacting and traversing said lap joint with said welding horn at said first predetermined traverse rate until the traverse rate attains said final higher predetermined traverse rate.

9. A process for welding according to claim 1 including continuously increasing the traverse rate immediately after initially contacting and traversing said lap joint with said welding horn at said first predetermined traverse rate until the traverse rate attains said final higher predetermined traverse rate.

10. A process for welding according to claim 1 including incrementally increasing the traverse rate after initially contacting and traversing said lap joint with said welding horn at said first predetermined traverse rate until the traverse rate attains said final higher predetermined traverse rate.

11. A process for welding according to claim 1 including maintaining the vibrational frequency of said ultrasonic welding horn at a constant frequency between about 30 kHz and about 45 kHz.

12. A process for welding according to claim 1 wherein said sheet has a thickness between about 25 micrometers and about 500 micrometers.

13. A process for welding according to claim 1 including traversing said lap joint with said ultrasonic welding horn by moving said lap joint while maintaining said ultrasonic welding horn stationary.

14. A process for welding according to claim 1 including traversing said lap joint with said ultrasonic welding horn by moving said ultrasonic welding horn while maintaining said lap joint stationary.

15. A process for welding according to claim 1 including traversing said lap joint with said ultrasonic welding horn by establishing relative movement between said ultrasonic welding horn and said said lap joint.

16. A process for welding comprising providing a sheet comprising thermoplastic material, overlapping the leading edge and the trailing edge of said sheet to form a lap joint, supporting said lap joint on an anvil, and welding said seam by contacting and traversing said seam from one end to the other with an ultrasonic welding horn, the improvement comprising initially contacting and traversing a first portion of said seam with said welding horn at a traverse rate of between about 4 millimeters per second and about 25 millimeters per second and, after a predetermined time period of between about 0.2 second and about 2.5 seconds; increasing said traverse rate to a final rate between about 30 millimeters per second and about 70 millimeters per second over a second portion of said lap joint while maintaining said horn at a substantially constant frequency during the entire welding pass through said first and second portions.

17. A process for welding according to claim 16 including maintaining the vibrational frequency of said ultrasonic welding horn at a frequency between about 15 kHz and about 50 kHz while traversing said seam with said welding horn at a traverse rate of between about 4 millimeters per second and about 25 millimeters per second and maintaining the vibrational frequency of said ultrasonic welding horn at a constant frequency between about 38 kHz and about 42 kHz while traversing said seam with said welding horn at said final rate.

18. A process for welding according to claim 16 including maintaining the vibrational frequency of said ultrasonic welding horn at a frequency between about 38 kHz and about 42 kHz while traversing said seam with said welding horn at a traverse rate of between about 6 millimeters per second and about 10 millimeters per second and, after a predetermined time period of between about 0.5 second and about 1 second, increasing said traverse rate to a final rate between about 45 millimeters per second and about 60 millimeters per second while maintaining the vibrational frequency of said ultrasonic welding horn at a constant frequency between about 38 kHz and about 42 kHz.

* * * * *